United States Patent [19]

Sauget

[11] Patent Number: 5,794,808
[45] Date of Patent: Aug. 18, 1998

[54] CONTAINER FOR SELF-DEFENSE SPRAY CANISTER

[76] Inventor: Judith B. Sauget, One Longue Vue Station, Sauget, Ill. 62206

[21] Appl. No.: 652,011

[22] Filed: May 21, 1996

Related U.S. Application Data

[63] Continuation of Ser. No. 336,286, Nov. 8, 1994, abandoned.

[51] Int. Cl.[6] ............................................. B65D 25/16
[52] U.S. Cl. .................. 220/400; 220/410; 220/356; 220/445
[58] Field of Search ........................... 220/352, 903, 220/671, 913, 751, 356, 737, 410, 408, 400, 23.83, 23.86, 445, 446, 447, 448, 724, 739, 740

[56] References Cited

U.S. PATENT DOCUMENTS

| 2,738,890 | 3/1956 | Dahl et al. | 220/400 |
|---|---|---|---|
| 2,935,549 | 5/1960 | Woods | 220/410 |
| 3,013,691 | 12/1961 | Prentice | 220/903 |
| 3,108,710 | 10/1963 | Lange et al. | 220/352 |
| 3,111,574 | 11/1963 | Spini | 220/410 |
| 3,159,550 | 12/1964 | Laming | 220/400 |
| 3,190,039 | 6/1965 | Carlson | 220/408 |
| 3,275,180 | 9/1966 | Optner et al. | 220/445 |
| 3,285,408 | 11/1966 | Carnaghi et al. | 220/352 |
| 3,518,164 | 6/1970 | Andelin et al. | 220/408 |
| 3,730,374 | 5/1973 | Picciano et al. | 220/445 |
| 3,918,920 | 11/1975 | Barber | 220/903 |
| 4,579,249 | 4/1986 | Patterson et al. | 220/445 |
| 4,646,933 | 3/1987 | Jurczenia et al. | 220/352 |
| 4,756,407 | 7/1988 | Larsen | 220/410 |
| 5,156,290 | 10/1992 | Rodriques | 220/913 |
| 5,170,906 | 12/1992 | Kochelek | 220/671 |
| 5,226,556 | 7/1993 | Lu | 220/445 |

FOREIGN PATENT DOCUMENTS

| 834512 | 3/1952 | Germany | 220/356 |
|---|---|---|---|
| 63-057051 | 3/1988 | Japan | 220/751 |

*Primary Examiner*—Stephen J. Castellano
*Attorney, Agent, or Firm*—Suelthaus & Walsh; John W. Kepler, III

[57] ABSTRACT

The present invention is a container for a canister of self-defense spray. It has an outer body and cap that are sized and arranged so that they do not interfere with the actuator of the canister, preventing an unwanted discharge of self-defense spray. The container is reusable. Steps and rings compensate for shorter canisters, and sleeves against the ribs compensate for slimmer canisters.

28 Claims, 13 Drawing Sheets

CONTAINER FOR SELF-DEFENSE SPRAY CANISTER

"This application is a continuation of application no. 08/336,286 filed on Nov.8, 1994, now abandoned."

BACKGROUND OF THE INVENTION

The present invention relates in general to a container for small spray canisters and pertains, more particularly, to containers for self-defense spray, such as mace or pepper spray. The container of this invention is an improvement over conventional, undisguised canisters of mace or pepper spray which are often carried hidden in a purse or pocket.

One drawback is that conventional containers are usually carried in a pocket or purse. This can be inconvenient if one has to look in a purse or dig in a pocket in response to an emergency situation.

Accordingly, it is an object of the present invention to provide an improved container for a self-defense spray canister that is adapted to provide a means to hang the canister where one can easily get to it in an emergency. The attachment on the end opposite the cap allows one to hang the apparatus on a chain or cord. Since the cap is on the opposite side of the attachment, one can easily flip the container into position for use.

Another object of the present invention is to provide an improved container for self-defense spray canister that is constructed to prevent spread of an unwanted discharge. Accordingly, this invention is adapted to provide a container with a cap that only comes off if grabbed, thus preventing one from losing the cap and unintentionally discharging the canister of self-defense spray.

A further object of the present invention is to provide a container for a self-defense spray canister that is adapted to discharge self-defense spray when necessary. This invention has a cap that is adapted to be removed with one hand while the other hand holds the container and is ready to activate the self-defense spray canister. The user may also hold the container and remove the cap using the thumb and forefinger or index finger.

Still another object of the present invention is to provide a container for a self-defense spray canister that may be sized and aligned not to interfere with the actuator. The cap sits on a step on the tube. The step and the tube are also sized and aligned so that the cap cannot interfere with the actuator, thus preventing an unwanted discharge of self-defense spray from the canister.

Still a further object of the present invention is to provide an improved container for a self-defense spray canister that is adapted for several sizes of canisters with steps, rings and sleeves that fit into the container. The steps and removable rings compensate for shorter canisters. The use of ribs, sleeves or a combination of ribs and sleeves can be used to compensate for slimmer canisters.

Another object of the present invention is to provide a container for a self-defense spray canister that provides a reusable container, allowing one to replace an empty canister with a full one.

A further object of this invention is to provide a container that can be made in any color or shape. One can make this container out of clear material as well.

Still another object of the present invention is to provide a container for a self-defense spray canister that may be equipped with a loop through which one can put a flexible cord, enabling one to secure the container around one's neck, attach it to a piece of clothing, Velcro(R), a key chain or to an otherwise accessible place.

The cord's ability to stretch would allow one to use the container in an emergency without wasting time disconnecting the container from the cord.

Still a further object of the present invention is to provide a container for a self-defense spray canister that is adapted for providing a container with a secure attachment. This invention allows one to hang the container on a cord or other apparatus and not fear losing it due to the container disengaging from the attachment.

SUMMARY OF THE INVENTION

To accomplish the foregoing and other objects of the present invention there is provided a container with a cap sitting on a step enabling one to remove it with one hand. Ribs align the canisters of self-defense spray in a preferred embodiment.

The cap is sized so that it does not interfere with an actuator on the canister. On a closed end of the container (opposite the open one) lies a loop, which allows one to attach the container to a string or chain. Other methods to attach the container to a string or a chain may be used.

One embodiment allows one to compensate for thinner canisters; one can put sleeves down the sides of the cavity. Other embodiments allow one to compensate for shorter canisters with a permanent step or removable rings on a bottom of the inner cavity of the container.

These and other objects and features of the present invention will be better understood and appreciated from the following detailed description of embodiments thereof, selected for purposes of illustration and shown in the accompanying drawings.

DETAILED DESCRIPTION

Figure 1:
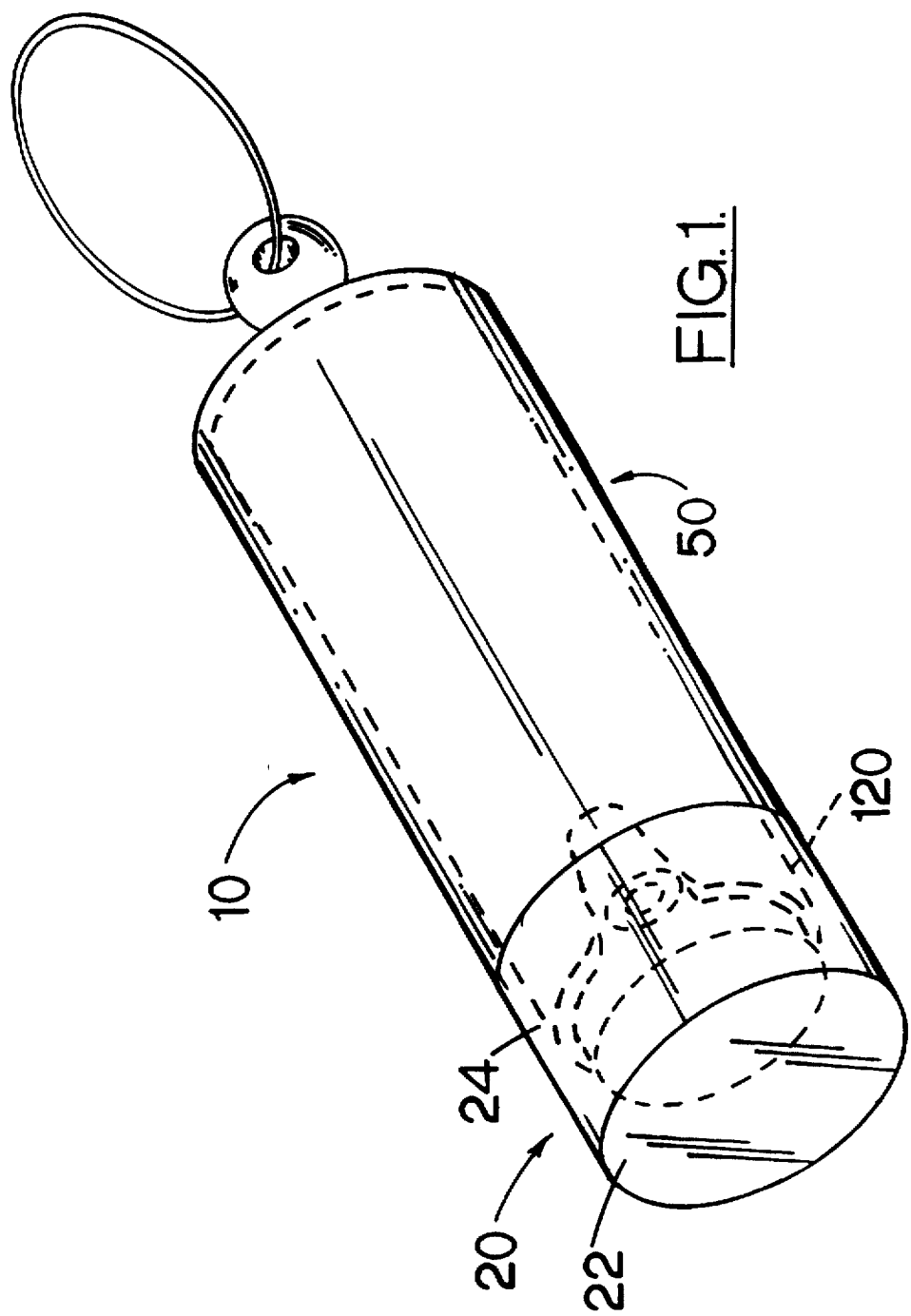
FIG. 1 is a perspective view of the container and cap combination constructed in accordance with the present invention and including a conventional self-defense spray canister shown in dashed lines.
Figure 2:
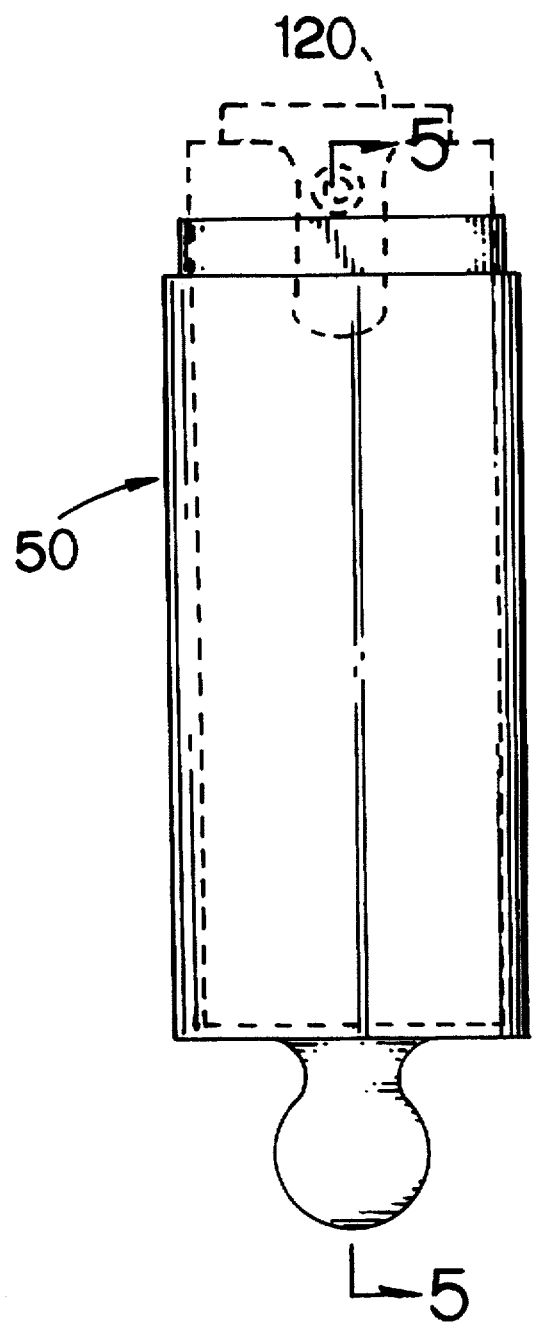
FIG. 2 is a side elevation view of the container depicted in FIG. 1 with the cap removed.
Figure 3:
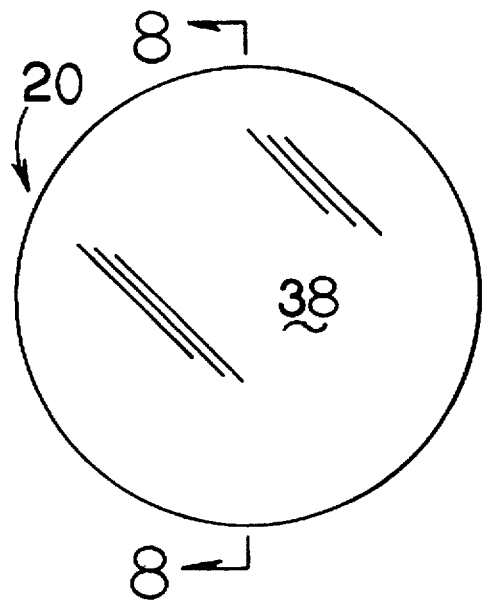
FIG. 3 is the top view of the cap of the container depicted in FIG. 1.
Figure 7:
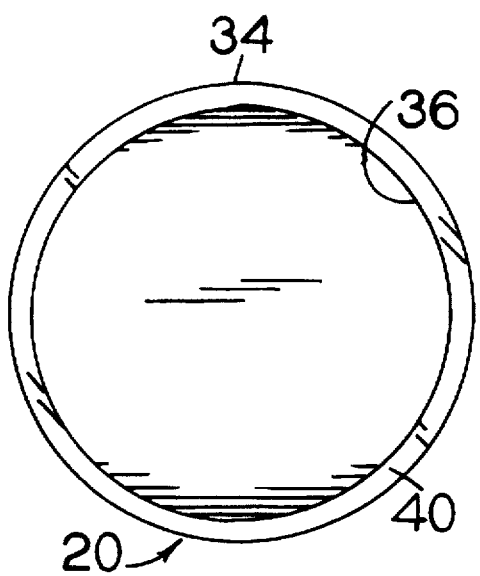
FIG. 7 is a bottom view of the cap depicted in FIG. 3.

Referring now to the drawings there are shown preferred embodiments of the container of this invention for use with a self-defense spray canister. The container is described in connection with a conventional canister of self-defense spray. The container of the present invention is particularly adapted for avoiding unwanted discharge of the spray and is characterized by the sizing of the cap, the location of the step on which it sits, and the ribs along the inner side wall in a preferred embodiment, all of which preclude any interference with the actuator of a conventional canister.

The drawings show a container 10 in conjunction with a conventional self-defense spray canister wherein the container comprises a cap 20, and a cylindrical body 50. The cap 20 is cylindrical and has a top surface 22 and a side surface 24.

Figure 8:
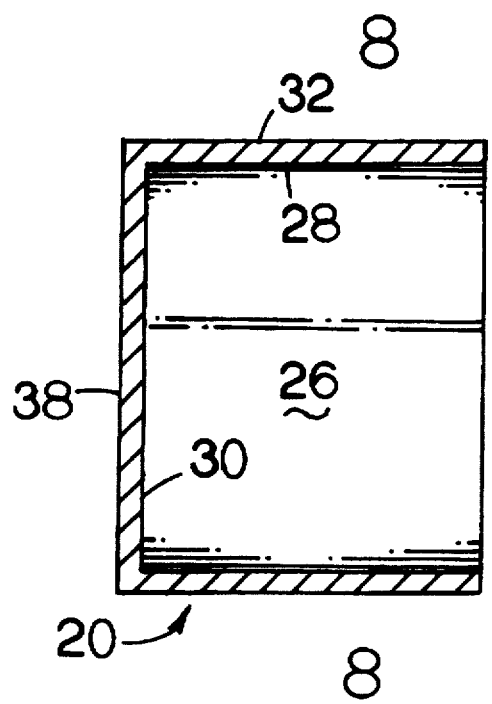
FIG. 8 is a section view taken along line 8—8 in FIG. 3.
Figure 4:
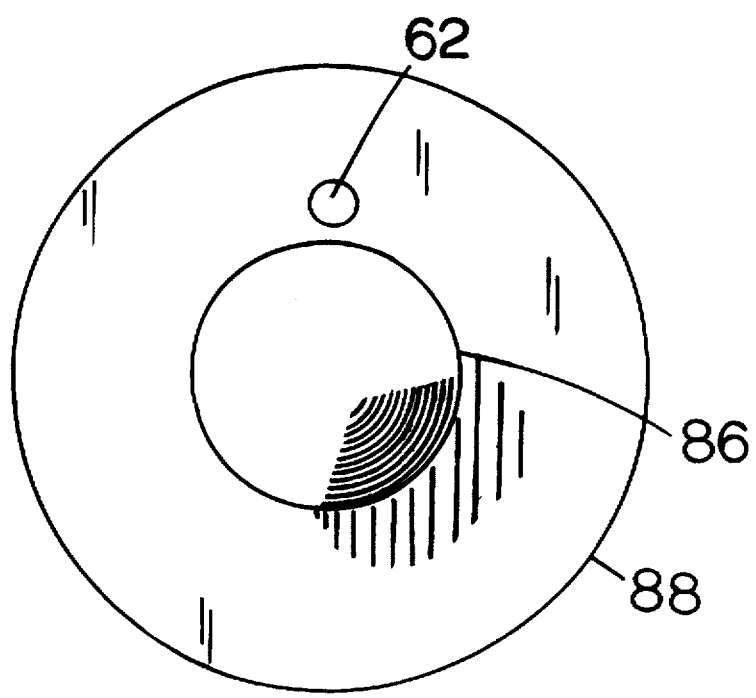
FIG. 4 is the bottom view of the container depicted in FIG. 1.

FIG. 8 reveals a cross-sectional view of the cap 20. The cap 20 has a cylindrical inner cavity 26 formed by a wall member, the inner cavity including a top inner surface 30, and a cylindrical inner side surface 28. The cap 20 has a bottom shelf 40 with an inner edge 36 and an outer edge 34. Although a preferred embodiment of the cap is cylindrical, the cap can be curved or any other shape.

Figure 5:
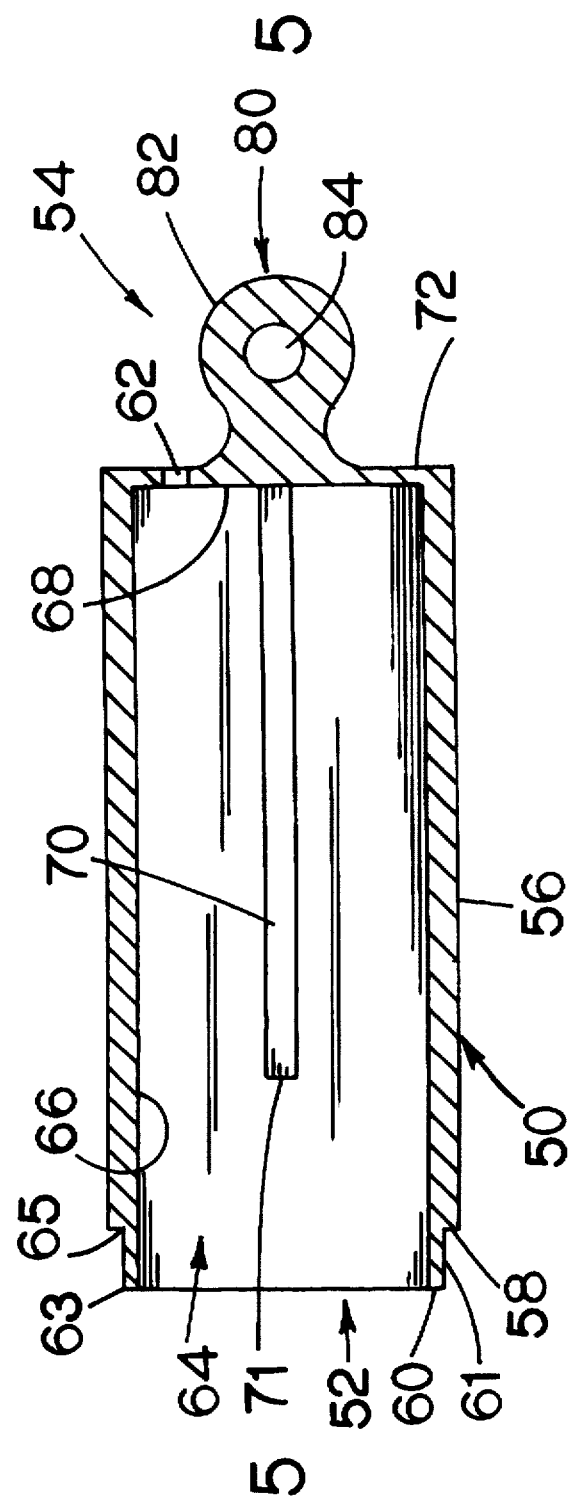
FIG. 5 is a section view along taken along line 5—5 in FIG. 2 without the cap of the container depicted in FIG. 1.
Figure 12:
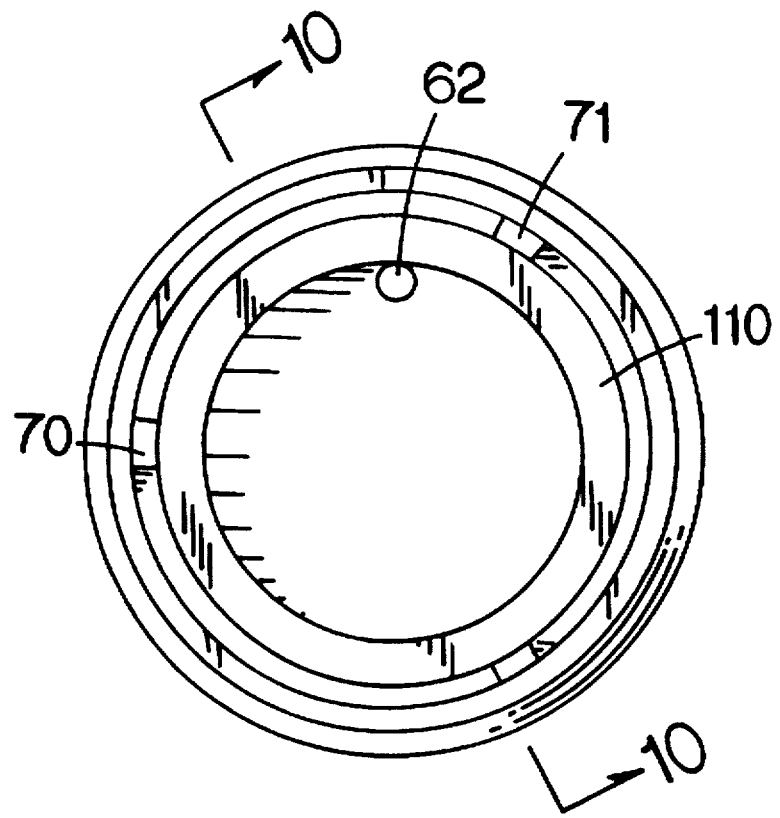
FIG. 12 is a top view of a container of the present invention illustrating the use of the aforementioned ring.
Figure 6:
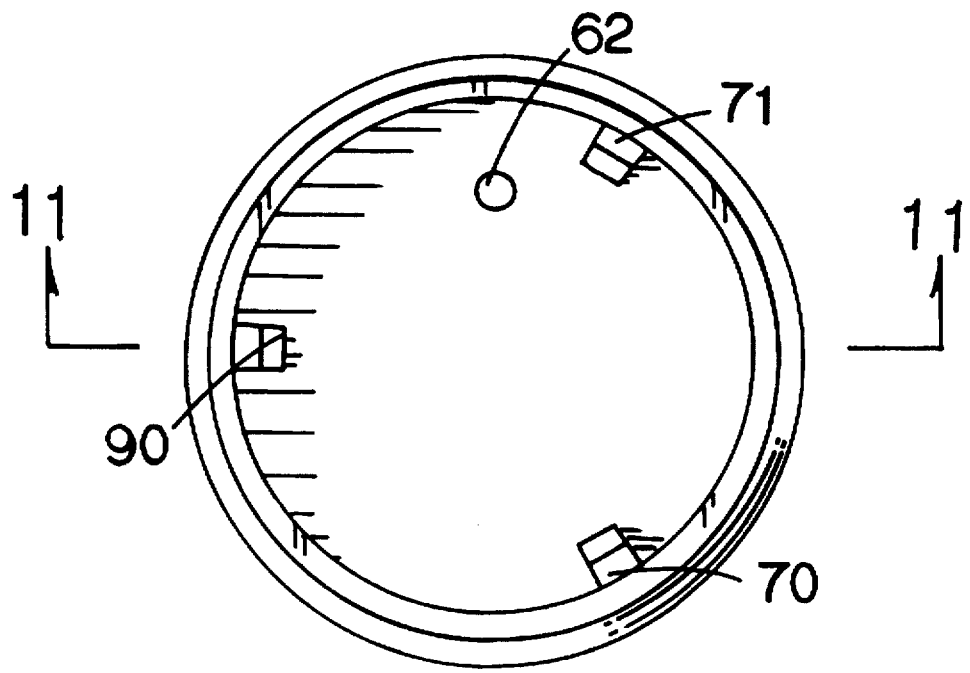
FIG. 6 is a top view of an open container of the present invention illustrating the use of a step.
Figure 9:
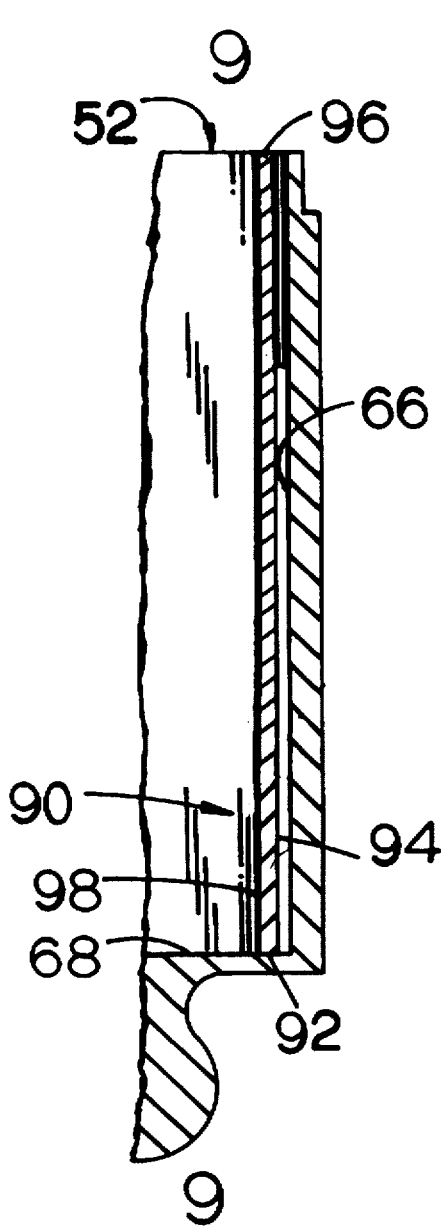
FIG. 9 illustrates a sleeve used in association with another embodiment of the present invention and is shown in a partial section view of FIG. 14.
Figure 10:
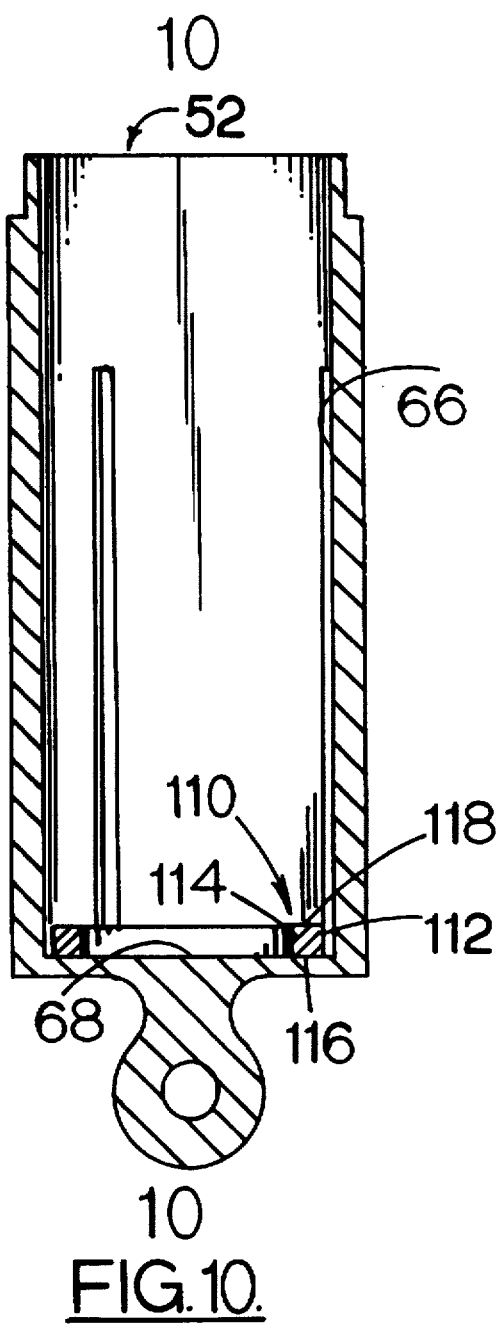
FIG. 10 illustrates a ring used in another embodiment of the present invention as shown in a section view taken along line 10—10 of the container depicted in FIG. 12.
Figure 11:
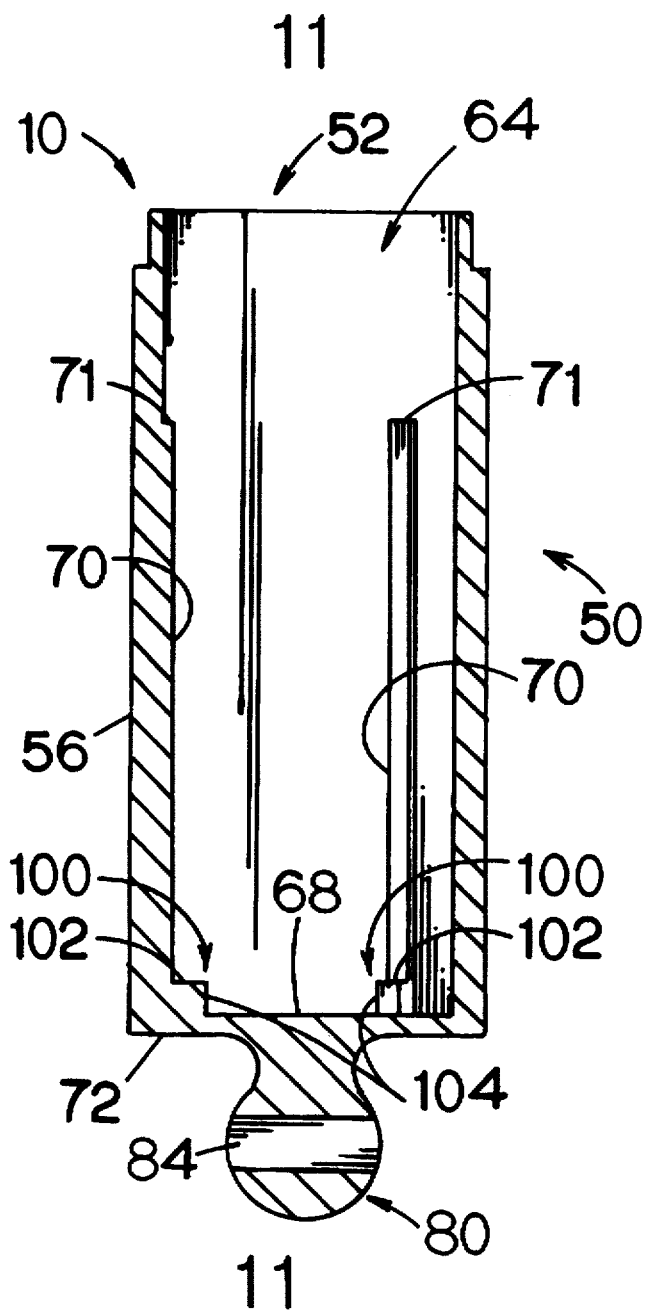
FIG. 11 is a step used to accommodate different size canisters illustrated in a section view taken along line 11—11 of the container depicted in FIG. 6.

FIG. 5 shows the cylindrical body 50 with a top end 52 and a bottom end 54. The cylindrical body 50 has a cylindrical inner cavity 64 formed by a wall member. The inner cavity 64 has an inner side surface 66 and a bottom surface 68. On the inner side surface 66 lie three ribs 70, preferably spaced 120° apart. Each rib has a top surface 71.

An outer surface of the cylindrical body 56 has a step for the cap comprising a step surface 58, a side surface 61 and a top surface 60. The top surface 60 and the side surface 61 meet to form an inner edge 63. The side surface 61 and the step for the cap 58 meet to form a middle edge 65. Although a preferred embodiment comprises a cylindrical container, other embodiments may have a curved top and bottom or any other shape.

On a bottom side 54 of the cylindrical body 50 lies a vent 62. Next to the vent is a loop 80. The loop 80 has an inner surface 84 and an outer surface 82. A cord fits through the inner surface 84. The base of the loop 80 forms an outer edge 86. A bottom outer surface 72 and the side outer surface 56 of the cylindrical body 50 form an outer edge 88.

A sleeve 90 and ribs 70 are used to compensate for slimmer canisters of self-defense spray. An outer side surface of the sleeve 94 comes into contact with the side surface of the inner cavity 66. A bottom surface of the sleeve 92 sits on the bottom surface of the inner cavity 68. A top surface of the sleeve 96 faces the top of the cylindrical body 52.

In one preferred embodiment, a bottom step 100 is molded as part of the bottom surface of the inner cavity 68 to compensate for shorter canisters of self-defense spray.

A top surface 102 of the bottom step 100 comes into contact with the bottom surface of the canister of self-defense spray.

A removable ring 110 can be used much like the bottom step 100. An outer surface of the ring 112 contacts the side surface of the inner cavity 66 and the ribs 70. The bottom surface of the canister contacts a top surface of the ring 118.

A bottom surface of the ring 116 contacts the bottom surface of the inner cavity 68. An inner surface 114 sits between the top surface 110 and the bottom surface 116.

Figure 13:
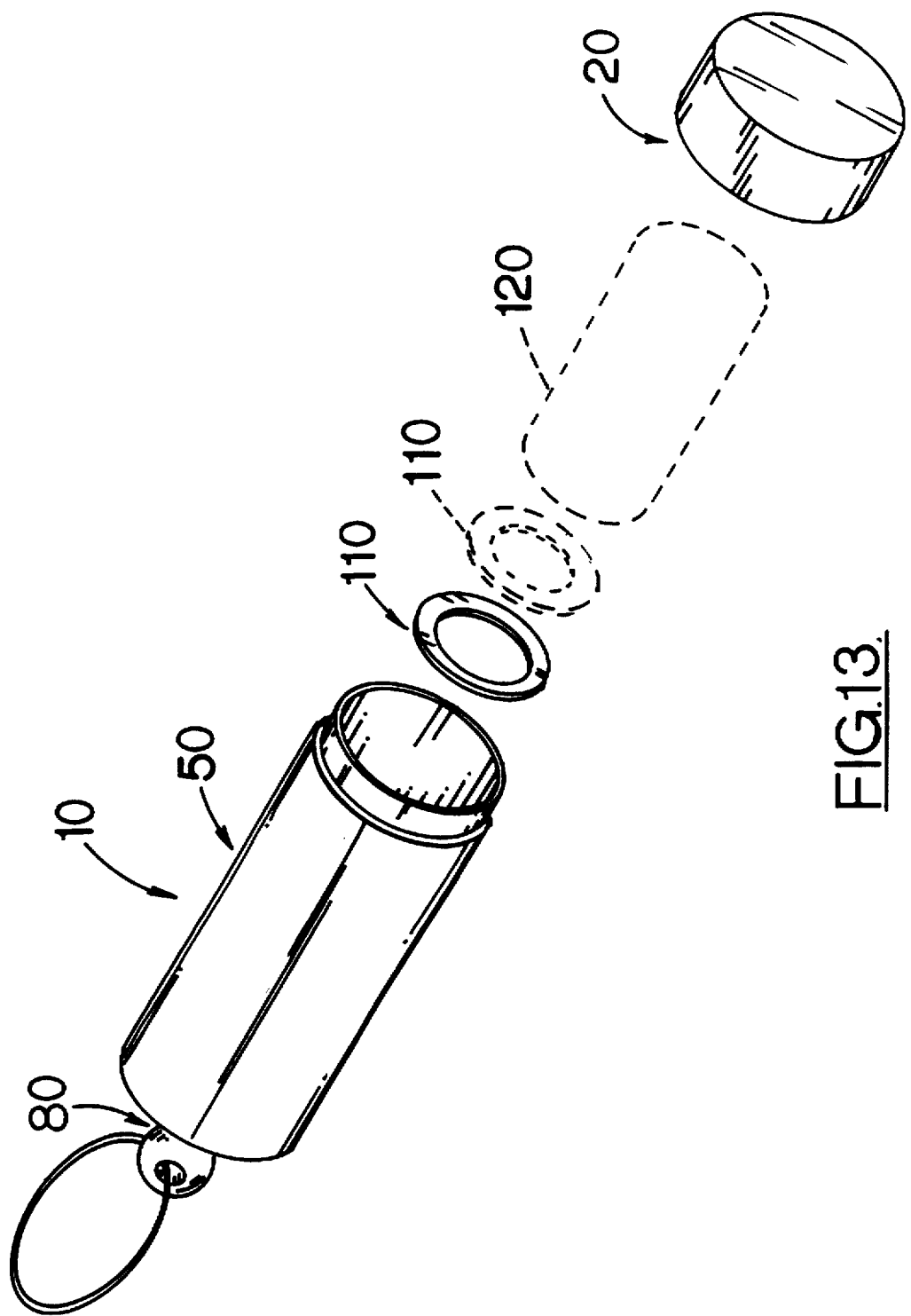
FIG. 13 is an exploded view of another embodiment of the present invention with a second ring depicted in dashed lines to suggest the arrangement of two or more rings.
Figure 14:
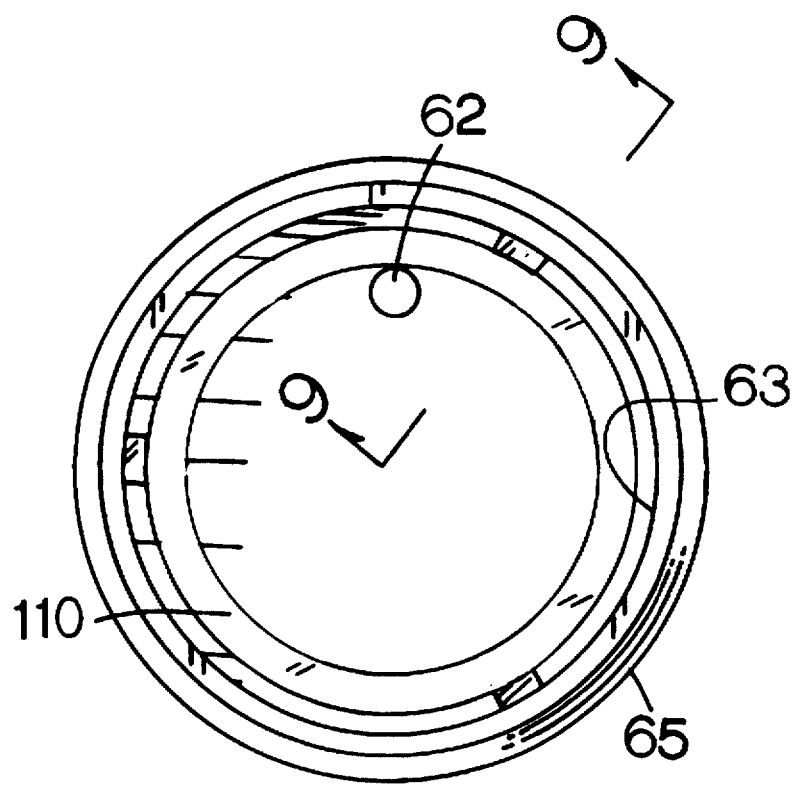
FIG. 14 is a top view of a container of the present invention illustrating the use of sleeve shown in partial section in FIG. 9.

FIG. 13 shows an exploded view of the use of the rings 110 with a canister 120. The rings 110 can be stacked to compensate for a very short canister 120. In a preferred embodiment, the rings are stacked by the manufacturer, or a step 100 is molded into the container.

In a presently preferred embodiment of the invention 130 a cap 132 has a rounded top 134. A body 136 has a rounded bottom 138 with a loop attached 140. The loop 140 has an inner surface 174 and an outer surface 176. The body 136 has an outer surface 142 and an inner surface 144. It also has a step 146 where the cap 132 sits. The step 146 has a side surface 148. The side surface 148 forms an edge 154 with the step surface 146. The body has an inner cavity 156 formed by a bottom surface 158 and the inner side surface 144. A vent 180 is located on the bottom side of the body 136. Ribs (not shown), similar in shape and purpose to ribs 70, may be provided in the inner cavity 156. The container has a top surface 182 which forms and edge 183 with the side surface 148.

The cap 132 has an outer side surface 160 and an inner side surface 162. A bottom shelf 164 sits on the step 146 when the assembly is closed. The bottom shelf 164 forms an edge 166 with the outer side surface 160 and another edge 168 with the inner side surface 162. An inner bottom surface 170 forms an inner cavity 172 with the inner side surface 162. The outer top surface of the cap 178 is rounded.

In operation, the container of the present invention enables a user or manufacturer to insert a canister of self-defense spray into the container. If the canister is too short to fit into the container properly, the user may use the removable rings 110 to compensate. In a preferred embodiment, a bottom step is molded by the manufacturer. If the canister is too slim to fit properly into the container, the user may insert the sleeves 90 to compensate; however, the manufacturer would insert the ribs and/or sleeves in the preferred embodiment.

The container 130, 10 can be used for several sizes of canisters, and it can be refilled with a fresh canister if the user empties a canister. Once the canister of self-defense spray sits in the proper position in the container 130, 10, the user would put the cap 132, 20 on top of the cylinder 136, 50. The cap 132, 20 would sit on the step surface 146, 58. The angular orientation of the canister's actuator is not important. Only the proper insertion of the canister into the container is important.

The container is sized so that the cap, positioned on the step surface, covers the actuator without interfering with it. Thus an unwanted discharge is prevented. In an emergency situation, the cap 132, 20 can be removed with one hand or the thumb and index finger, and the actuator is ready for use.

In the presently preferred embodiment of the invention the assembly 130 is approximately 6.122 inches from the end of the loop 140 to the top of the cap 132. The outside of the cap 132 is approximately 1.190 inches wide, and it is flush with the outside surface of the body 136. The top of the cap 134 has a radius of curvature of 0.740 inches, and the highest point sits 0.300 inches from the top of the cylindrical portion of the cap. The cylindrical portion of the cap is 0.906 inches tall. The inner cavity 172 is approximately 1.060 inches wide and 0.903 inches tall.

The step 146 sits 0.270 inches from the top end of the body 136. The inner cavity 156 is approximately 0.980 inches wide. The outer surface of the bottom 138 of the body 136 has a radius of curvature of 0.740 inches. The loop 140 is approximately 0.274 inches wide and approximately 0.450 inches long. The vent 180 is approximately 0.421 inches from the center.

In another preferred embodiment the cap 20 is 0.9375 inches long with an outer diameter of 1.154 inches and an inner diameter of 1.054 inches. The cylindrical body 50 has an outer diameter of 1.154 inches (the same as the outer diameter of the cap 20). It is 3.092 inches from the end 52 to the center of the loop 80. The loop's 80 inner diameter is 0.2000 inches, and the outer diameter is 0.5000 inches.

The step 58 on which the cap 20 sits is 0.2000 inches from the end of the cylindrical body 52. This orientation of the cap prevents unwanted interference with the actuator of a conventional canister of self-defense spray. The vent's 62 diameter is 0.0930 inches. The ribs 70 are spaced 120° apart and extend from the bottom 68 of the inner cavity 64 up to 0.7050 inches from the top end 52 of the cylindrical body 50.

From the foregoing description those skilled in the art will appreciate that all of the objects of the present invention are realized. An improved container for a self-defense spray canister has been shown and described that is adapted to provide a means to hang the canister where one can easily get to it in an emergency. The attachment on the end opposite the cap allows one to hang the apparatus on a chain or cord. Since the cap is on the opposite side of the attachment, one can easily flip the container into position for use.

This improved container for a self-defense spray canister is constructed to prevent spread of an unwanted discharge. It only comes off if grabbed, thus preventing one from losing the cap and unintentionally discharging the canister of self-defense spray.

The present invention also provides a container for a self-defense spray canister that is adapted to discharge self-defense spray when necessary. This invention has a cap sitting on a step in the outer cylindrical body, which can be removed with one hand, or the thumb and index finger.

The present invention also provides a container for a self-defense spray canister that may be sized and aligned not to interfere with the actuator. The cap sits on a step on the outer cylindrical body. The step and the cylindrical body are also sized and aligned so that the cap cannot interfere with the actuator, thus preventing an unwanted discharge of self-defense spray from the canister when the cap is in place.

This improved container can be adapted for several sizes of canisters with ribs, steps, rings and sleeves that fit into the container. The steps and removable rings compensate for shorter canisters. The sleeves against the ribs compensate for slimmer canisters.

The container of the present invention is reusable, thus allowing one to replace an empty canister with a full one.

To enable one to secure this container, it has a loop through which one can put a flexible cord. The cord's ability to stretch would allow one to use the container in an emergency without wasting time disconnecting the container from the cord.

This container provides a secure attachment. It allows one to hang the container on a cord, Velcro(R) or a key chain and not fear losing it due to the container disengaging from the attachment.

While specific embodiments have been shown and described, many variations are possible. The particular shape of the container, which is cylindrical in the above example, including all dimensions, may be changed as desired to suit the self-defense spray canister with which it is used. The housing materials may vary, although high-impact plastic is preferred. Other preferred embodiments include wood or metal. Since this container holds a pressurized self-defense spray in a canister, the container itself does not have to meet any pressure requirements. The configuration and the size or number of the sleeves, ribs or rings may vary although it is believed that a single sleeve or ring could be made available for specific sizes of self-defense spray canisters.

In the most simplified version of the invention the container is sized to suit the self-defense spray canister. In other embodiments the ribs, sleeve, or rings used may have portions cut out to reduce the overall weight of that embodiment of the invention.

The loop in this invention can be any size, shape, or material, and the cord can be any length. Although one type of actuator is pictured, any type of actuator can be used with this invention. The main requirement is that the container and cap be sized so they do not interfere with the actuator.

Even though a loop is pictured, the means to attach the body of the container 50 can be any configuration that would hold a cord or other means to attach a container.

Although the containers in FIGS. 1–22 are cylindrical, any shape of container can be used if it is sized not to interfere with the actuator of the canister in question. Given that other shapes may be used, the ribs, step, sleeves and rings may be sized and shaped to accommodate the inner cavities of these containers.

Even though a cord is pictured, one could use another means of attachment through the loop, such as a belt loop, Velcro(R), a key ring, necklace or bracelet. The cord merely allows one to attach the container to a convenient place.

Although the vent pictured is circular, one may use any convenient size, shape or placement of the vent without departing from the spirit of the invention.

Figure 15:
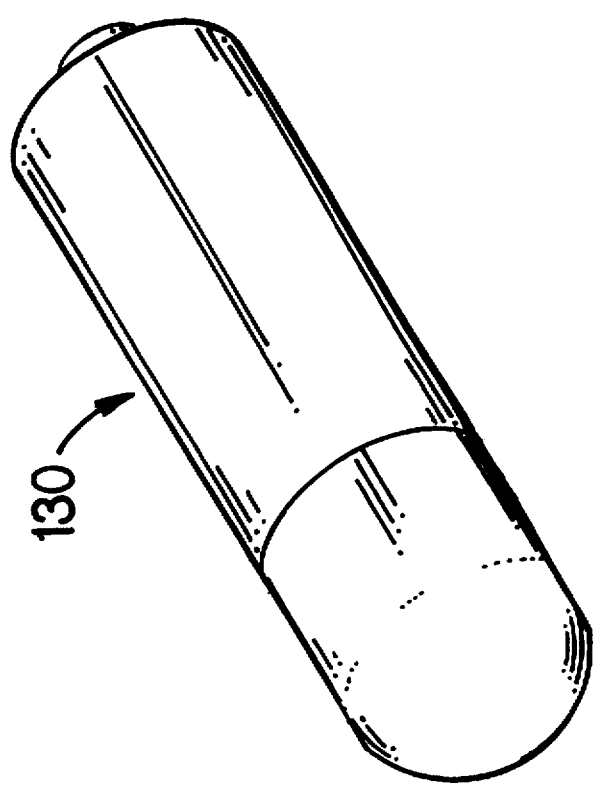
FIG. 15 is a perspective view of the second embodiment of the second embodiment of the present invention.
Figure 16:
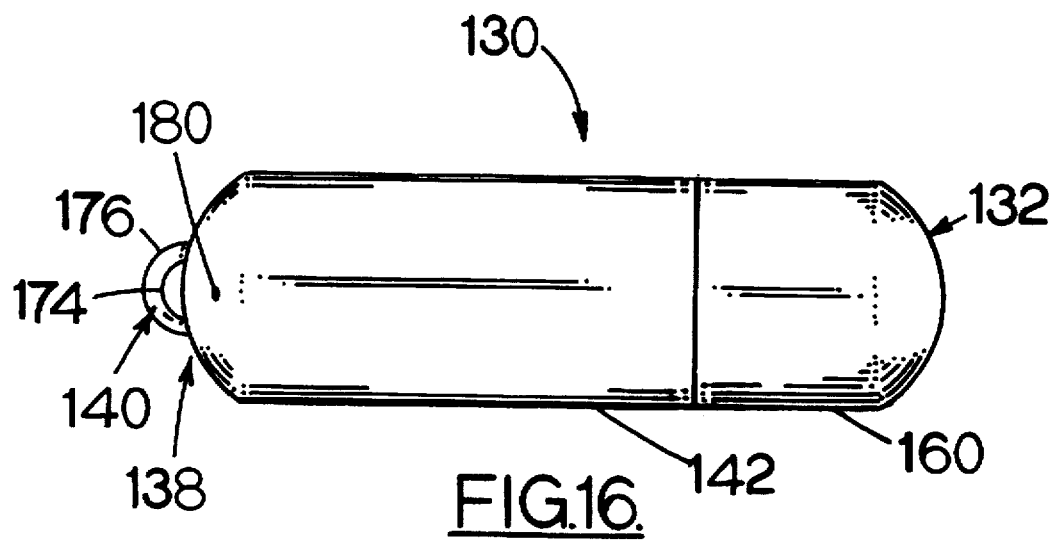
FIG. 16 is the side elevation view of the second embodiment of the present invention.
Figure 17:
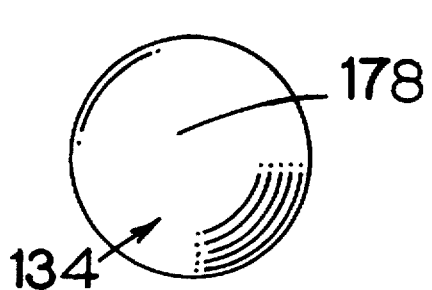
FIG. 17 is the top view of the cap used in the second embodiment of the present invention.
Figure 18:
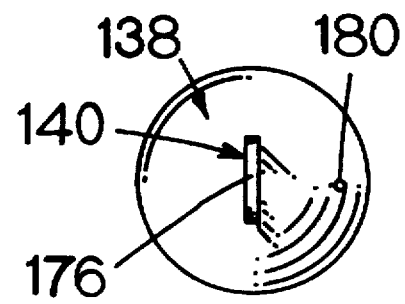
FIG. 18 is the bottom view of the container in the second embodiment of the present invention.
Figure 19:
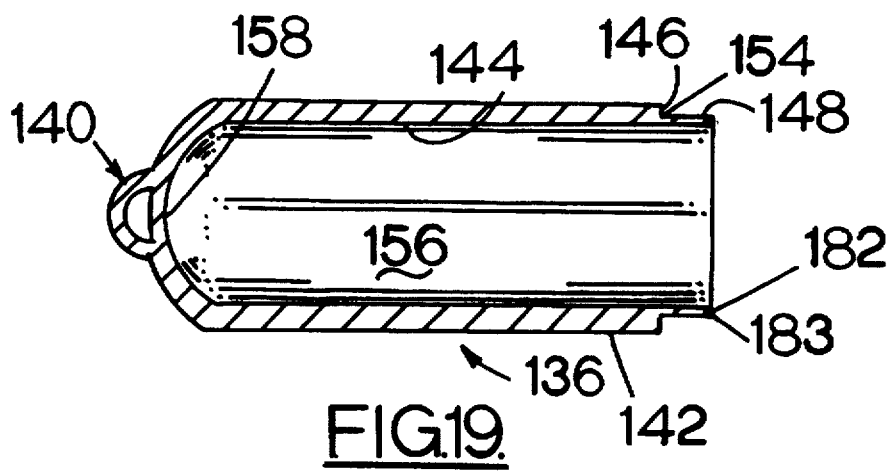
FIG. 19 is a section of the side elevation view of FIG. 16.
Figure 20:
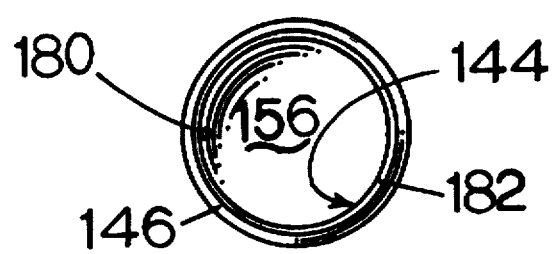
FIG. 20 is the top view of an open container of the second embodiment without the ribs.
Figure 21:
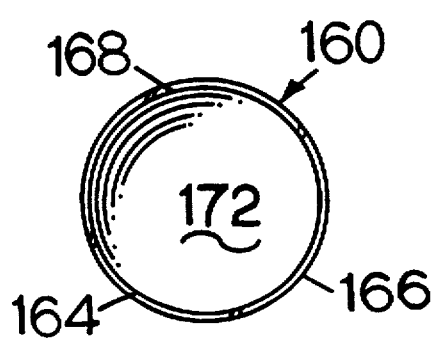
FIG. 21 is the bottom view of the cap used in the second embodiment.
Figure 22:
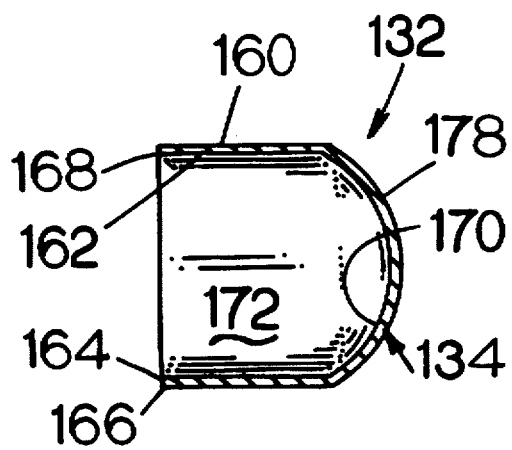
FIG. 22 is a section of the cap used in the second embodiment.

In FIG. 1 and FIG. 15 the outer edge of the cap 132, 20 is flush with the outer surface of the cylindrical body 136, 56. This attribute is not required. The cap 132, 20 could be a completely different shape from the body 136, 50.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A container for a self-defense spray canister, comprising:

a container formed by a wall member, the first wall member having a first outer surface, the first wall member forming a first inner cavity, the first inner cavity having a first open end and a first closed end, an inner bottom surface and an inner side surface;

a cap formed by a second wall member, the second wall member having a second outer surface, the second wall member forming a second inner cavity, the second inner cavity having a second open end and a second closed end, the second inner cavity having a top surface, and a second inner side surface, with a bottom shelf terminating into a first shoulder with the second outer surface and a second shoulder with the second inner side surface;

a step for the bottom shelf, the second shoulder and the inner side surface of the cap, the step located in the first outer surface, whereby the cap is sized and the step being located not to interfere with an actuator on a canister of self-defense spray sitting in the first inner cavity;

means to align the canister within the container as the canister is inserted into the container, the means to align the canister comprising a plurality of substantially rigid ribs along the inner side of the container;

means to compensate for shorter canisters of self-defense spray, and removable means to compensate for slimmer canisters of self-defense spray.

2. The container described in claim 1 wherein said means to compensate for a shorter canister of self-defense spray is at least one removable ring on the inner bottom surface.

3. The container described in claim 1 wherein said means to compensate for a shorter canister of self-defense spray comprises at least one bottom step which lies on the inner bottom surface.

4. The container described in claim 1 wherein said removable means to compensate for slimmer canisters of self-defense spray is a removable sleeve inserted along the first inner cavity.

5. The container described in claim 1 further comprising a means to attach the closed end of the container.

6. The container described in claim 5 wherein said means to attach the closed of the container is a loop fixedly attached to the first closed end.

7. The container described in claim 1 wherein the container is cylindrical.

8. The container described in claim 1 wherein the container further comprises a vent in the closed end of the container.

9. A container for self-defense spray comprising:

a cylindrical body having a first open end, a first outer side surface, and a first closed end defining a first inner cavity, the first inner cavity having an inner side surface and an inner bottom surface;

a cylindrical cap having a closed top surface, an open bottom surface, a second outer side surface defining a second inner cavity, the second inner cavity having an inner top surface and a second inner side surface with a bottom shelf terminating into a first shoulder with the second outer side surface and a second shoulder with the second inner side surface;

a step for the bottom shelf of the cap, the second shoulder, and the second inner side surface, in the first outer side surface, the cap being sized and the step being located not to interfere with an actuator on a canister of self-defense spray sitting in the first inner cavity;

a plurality of stubstantially rigid ribs along the inner side surface and extending into the first inner cavity, whereby the canister is aligned as the canister is inserted into the container;

means to compensate for shorter canisters of self defense spray, and removable means to compensate for slimmer canisters of self defense spray.

10. The container described in claim 9 wherein said means to compensate for a shorter canister of self-defense spray is at least one removable ring on the inner bottom surface.

11. The container described in claim 9 wherein said means to compensate for a shorter canister of self-defense spray comprises at least one bottom step which lies on the inner bottom surface.

12. The container described in claim 9 wherein said removable means to compensate for a slimmer canister of self-defense spray is a removable sleeve inserted in the first inner cavity.

13. The container described in claim 9 further comprising a means to attach the first closed end body.

14. The container described in claim 13 wherein said means to attach the first closed end is a loop fixedly attached to the first closed end.

15. A container for a canister of self-defense spray comprising:

a cylindrical body having a first outer side surface, an open end, and a closed end defining a first inner cavity, the first inner cavity having an inner side surface, an inner bottom surface and a vent extending through the cylindrical body;

a cylindrical cap having a closed top surface, an open bottom, a second outer side surface defining a second inner cavity, the second inner cavity having a top surface and a second inner side surface, with a bottom shelf terminating into a first shoulder with the second outer side surface and a second shoulder with the second inner side surface;

a step for the bottom shelf of the cap, the second shoulder and the second inner side surface, in the first outer side surface, the cap being sized and the step being located not to interfere with an actuator on a canister of self-defense spray sitting in the first inner cavity;

three substantially rigid ribs spaced 120° apart along the inner side surface, whereby the canister is aligned as the canister is inserted into the container and the canister is supported in a substantially upright position within the container, particularly when the canister of self-defense spray is used, means to compensate for shorter canisters of self defense spray, and removable means to compensate for slimmer canisters of self defense spray.

16. The container described in claim 15 wherein said means to compensate for a shorter canister of self-defense spray is at least one removable ring on the inner bottom surface.

17. The container described in claim 15 wherein said means to compensate for a shorter canister of self-defense spray comprises at least one step which lies on the inner bottom surface.

18. The container described in claim 15 wherein said removable means to compensate for a slimmer canister of self-defense spray is a removable sleeve inserted along the first inner cavity.

19. The container described in claim 15 further comprising a means to attach the closed end.

20. The container described in claim 19 wherein said means to attach the closed end is a loop fixedly attached to said closed end.

21. The container described in claim 15, wherein the vent is located on the closed end of the cylindrical body.

22. A container for a self-defense spray canister, comprising:

- a container formed by a first wall member, the first wall member having a first outer surface, the first wall member forming a first inner cavity, the first inner cavity having a first open end and a first closed end, the first closed end having a rounded outside surface, an inner bottom surface and an inner side surface;
- a cap formed by a second wall member, the second wall member having a second outer surface, the second wall member forming a second inner cavity, the second inner cavity having a second open end and a second closed end, the second closed end having a rounded outside surface, the second inner cavity having a top surface, and a second inner side surface, with a bottom shelf terminating into a first shoulder with the second outer surface and a second shoulder with the second inner side surface;
- a step for the bottom shelf, the second shoulder and the inner side surface of the cap, the step located in the first outer surface, whereby the cap is sized and the step being located not to interfere with an actuator on a canister of self-defense spray sitting in the first inner cavity;

means to align the canister within the container as the self-defense spray canister is inserted into the container, the means to align the canister comprising a plurality of substantially rigid ribs along the inner side surface of the container;

means to compensate for shorter canisters of self defense spray, and removable means to compensate for slimmer canisters of self defense spray.

23. The container described in claim 22 wherein said means to compensate for a shorter canister of self-defense spray is at least one removable ring on the inner bottom surface.

24. The container described in claim 22 wherein said means to compensate for a shorter canister of self-defense spray comprises at least one bottom step which lies on the inner bottom surface.

25. The container described in claim 22 wherein said removable means to compensate for slimmer canisters of self-defense spray is a removable sleeve inserted along the first inner cavity.

26. The container described in claim 22 further comprising a means to attach the closed end of the container.

27. The container described in claim 26 wherein said means to attach the closed of the container is a loop fixedly attached to the first closed end.

28. The container described in claim 22 further comprising a vent in the first closed end.

\* \* \* \* \*